(12) United States Patent
Pragada et al.

(10) Patent No.: US 8,924,197 B2
(45) Date of Patent: Dec. 30, 2014

(54) SYSTEM AND METHOD FOR CONVERTING A NATURAL LANGUAGE QUERY INTO A LOGICAL QUERY

(75) Inventors: Sreenivasa Rao Pragada, Tarrytown, NY (US); Viswanath Dasari, Alpharetta, GA (US); Abhijit A Patil, Atlanta, GA (US)

(73) Assignee: Semantifi, Inc., Stamford, CT (US)

( * ) Notice: Subject to any disclaimer, the term of this patent is extended or adjusted under 35 U.S.C. 154(b) by 1281 days.

(21) Appl. No.: 11/929,734

(22) Filed: Oct. 30, 2007

(65) Prior Publication Data
US 2008/0104071 A1 May 1, 2008

Related U.S. Application Data

(60) Provisional application No. 60/863,799, filed on Oct. 31, 2006.

(51) Int. Cl.
*G06F 17/27* (2006.01)
*G06F 17/30* (2006.01)

(52) U.S. Cl.
CPC ................................. *G06F 17/3043* (2013.01)
USPC ............... 704/9; 704/246; 704/247; 704/251; 704/252

(58) Field of Classification Search
CPC ... G06F 17/271; G06F 17/274; G06F 17/277; G06F 17/2755; G06F 17/2735; G06F 17/2785
See application file for complete search history.

(56) References Cited

U.S. PATENT DOCUMENTS

| 5,664,173 | A | 9/1997 | Fast | |
|---|---|---|---|---|
| 6,199,063 | B1 | 3/2001 | Colby et al. | |
| 7,092,958 | B2 | 8/2006 | Hempstead et al. | |
| 7,249,127 | B2 * | 7/2007 | Azzam | 707/772 |
| 2002/0059069 | A1 * | 5/2002 | Hsu et al. | 704/257 |
| 2002/0147578 | A1 * | 10/2002 | O'Neil et al. | 704/9 |
| 2004/0205079 | A1 * | 10/2004 | Azzam | 707/100 |
| 2005/0131929 | A1 * | 6/2005 | Bailey | 707/101 |

* cited by examiner

*Primary Examiner* — Leonard Saint Cyr
(74) *Attorney, Agent, or Firm* — Gordon Kessler

(57) ABSTRACT

Disclosed are systems, methods, and computer readable media for converting a natural language query into a logical query. The method embodiment comprises receiving a natural language query and converting the natural language query using an extensible engine to generate a logical query, the extensible engine being linked to the toolkit and knowledge base. In one embodiment, a natural language query can be processed in a domain independent method to generate a logical query.

37 Claims, 5 Drawing Sheets

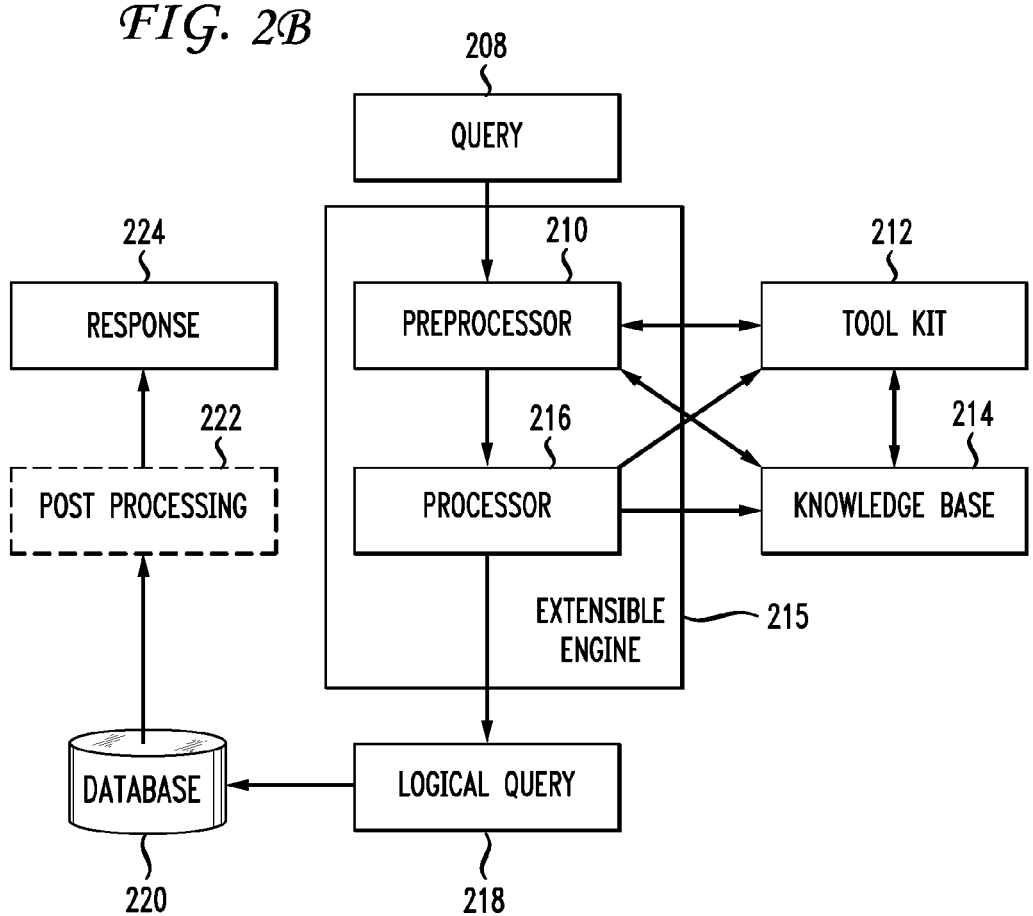

SYSTEM AND METHOD FOR CONVERTING A NATURAL LANGUAGE QUERY INTO A LOGICAL QUERY

PRIORITY CLAIM

The present application claims the benefit of U.S. Provisional Application No. 60/863,799, filed Oct. 31, 2006, the content of which is incorporated herein by reference in its entirely.

BACKGROUND OF THE INVENTION

1. Field of the Invention

The present invention relates generally to semantic searches and specifically to converting natural language queries into logical queries.

2. Introduction

Many approaches have been used to try to solve the general problem of using natural language to search structured databases or unstructured text with varying levels of success. A potential approach or solution can be broadly divided into two parts: (1) processing the natural language question into a logical query, and (2) mapping the converted query to databases. This application discusses the first part.

Keyword matching and grammar-based natural language processing are some common approaches to addressing the first part of processing the natural language question into a logical query. Each of these two techniques have significant limitations individually. Keyword-based querying is a simple method of matching keywords in the user query to the database entities. Keyword matching may be effective in handling simple questions like "number of customers," but tends be highly error prone in handling complex questions when understanding proper associations of the different parts of the user query is necessary.

A keyword-based natural language query consists of a simple list of words entered by the user, much like what many people enter as search strings in modern search engines. For example, if a user is searching for the five-day weather forecast in Bermuda, the user may say or enter the text "Bermuda weather". From the user's point of view, these keyword-based searches may be convenient and do not require strict syntax while entering the query. The query context is in the user's mind and thus would be very difficult, if not impossible, for a natural language processor to understand the meaning and intent of the query. For example, if user enters the keywords "cold fusion", the system would not know if the user meant ColdFusion the software, the energy generation technique used by the nuclear physicists, or two unrelated keywords "cold" and "fusion".

Three fundamental problems with a keyword-based approach are (1) the same word could have multiple, different meanings based on the context or domain the user is interested in, (2) the keyword-based approach could result in a huge list of alternative answers leaving the burden of selecting the right answer to the user, and (3) the approach becomes ineffective as the targeted volume of search space words increases.

A grammar-based or language processing approach to dissecting a user query using parts-of-speech, grammars, etc. is also common. However, the success of grammar-based solutions is limited based on dependency on a properly framed question, language ambiguity, and, most importantly, the lack of a grammar or a minimized grammar appropriate to business-speak which is how business users tend to ask questions (or for a particular domain).

A grammar-based approach typically defines a strict syntax for the natural language processor. The rules are defined for convenience of implementation. Users are seldom aware of these rules or the rationale behind them. When a user types the query that exactly matches with the foreordained syntax, the language processor understands the query and possibly some of the relationships among the keywords. These processors do a better job in accurately recognizing the meaning of the query when compared with keyword-based language processors.

However, grammar based processors also have many limitations. First, grammar rules are not known to the end user. For example, users may not be aware that a concept must be followed by unit of time for the grammar rule to work as in "Sales in January". For some users, an input such as "January Sales" may be more convenient. Second, the grammar rules can become complex as combinations of rules increases. Third, grammar rules focus more on syntax and order than the semantic meanings and relationships. Fourth, grammar-based processors are hard to extend and are unable to find new relationships that the system does not already know about. Fifth, the grammar-based approach is more suitable for implementing a new programming language on a specific hardware platform and is not an effective solution for natural language processing.

Programmatic and rules based approach to parsing natural user query portions is another common approach in addressing some of the challenges of these techniques. For example, developers attempt to envision various forms of natural phrases and try to address them programmatically, writing code for each or more common structures. While this approach may prove reasonably effective with limited phrases, it can become unwieldy very quickly when parsing natural language queries.

Folksonomy is another information retrieval methodology consisting of user generated, open-ended labels that categorize content such as web pages, online photographs, and web links. A folksonomy is most notably contrasted from a taxonomy in that the authors of the labeling system are often the main users (and sometimes originators or experts) of the content to which the labels are applied. The labels are commonly known as tags and the labeling process is called tagging. The process of folksonomic tagging is intended to make a body of information increasingly easier to search, discover, and navigate over time. A well-developed folksonomy is ideally accessible as a shared vocabulary that is both originated by and familiar to its primary users. Two widely cited examples of websites using folksonomic tagging are Flickr and Del.icio.us. Folksonomy, while collaboratively generated, suffers from the same challenges as keyword-based search with the lack of relationship information.

Lastly, an ontology attempts to represent a real-world view of business models, grammars, sentence constructs, or phrases. However, building semantic frameworks quickly becomes time consuming and cost prohibitive as the scope of the application or the domain increases.

Accordingly, what is needed in the art is a way to process a natural language query that can overcome the limitations of a single, rigid approach.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for converting a natural language query into a logical query. An exemplary method embodiment of the invention includes receiving a natural language query, processing the natural language query using an extensible engine to generate a logical query, the extensible engine being linked to the toolkit and knowledge base.

The principles of the invention may be utilized to provide a flexible, robust method of converting natural language queries to a logical query without forcing the user to learn an artificial syntax other than that of natural language or without using any structured input/query forms.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B illustrates basic components of the invention;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
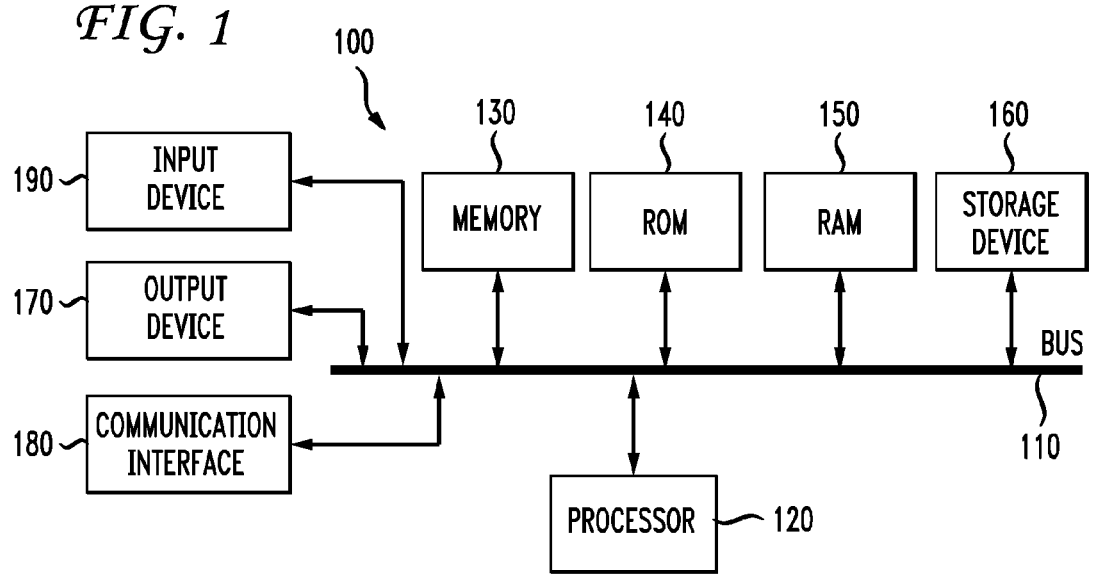
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2A:
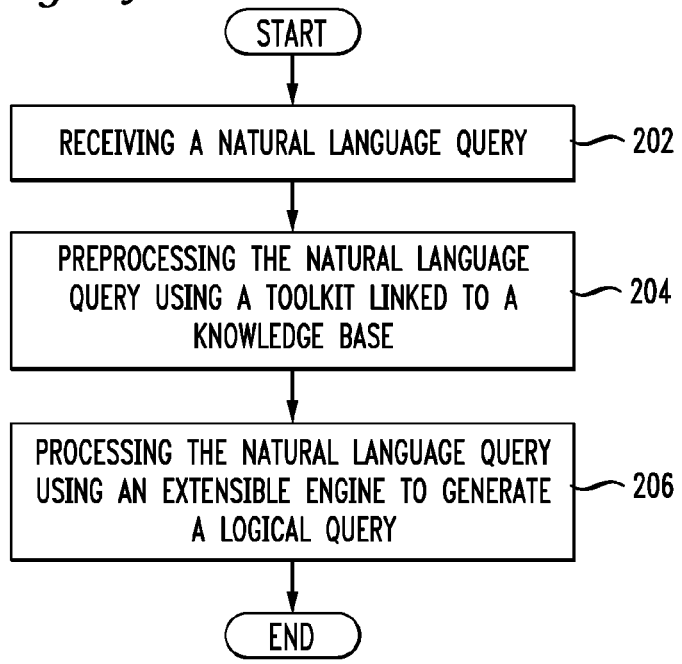
FIG. 2A illustrates a method embodiment of the invention.

FIG. 2A illustrates a method embodiment of the invention. First, the method includes receiving a natural language query (202). As the natural language query is received, or afterwards, each word in the query may be examined and corrected, if necessary. A dictionary of expected or acceptable words may serve as a correction mechanism. Correcting the natural language query in this way allows for a degree of flexibility and leniency in the conversion from natural language to a structured logical query. Flexibility may be a desirable attribute when the natural language is typed text which may contain typos or when the natural language is speech with a thick accent, for example. Known processes may be used to convert an audible natural language utterance in the text, such as automatic speech recognition technology.

Second, the method preprocesses the natural language query using the extensible engine toolkit linked to a knowledge base (204). As a part of the preprocessing, certain predictable word patterns may be identified and parsed. For example, if the word pattern "from NUMBER1 to NUMBER2" is recognized, that phrase is a range of numbers, whereas the same general word pattern "from PLACE1 to PLACE2" may mean something entirely different. Recognition of commonly expected or commonly used word patterns may simplify the preprocessing. The knowledge base may include semantic frameworks explaining business or domain models, or universal word patterns, mathematical or regular expressions or conversion tables. The knowledge base is a collection of knowledge about and relationships between concepts. The toolkit may include one or more of a parts speech tagger, spell checker, domain instance recognizer, word compactor, synonym handlers, domain specific taggers, a snowflake processor, ambiguity handlers, series recognizers or word-pattern recognizers. Each toolkit item may be included in part or in whole and can applied multiple times. More on these various tools in the toolkit will be provided below.

For example, the ambiguity handlers can recognize and resolve ambiguity when different tools in the toolkit yield dissimilar outcomes.

Third, the method processes the natural language query using an extensible engine to generate a logical query, the extensible engine being linked to the toolkit (206). Processing the natural language query may include parsing the natural language query repeatedly until every word is recognized as a domain, general, or an attribute concept, i.e., no additional information can be inferred about the natural language query within the scope of the toolkit and knowledge base. Repeatedly querying every word until it is recognized is a process similar to a barcode scanner. In barcode scanners, one scan of a damaged barcode may not provide enough information. Multiple scans at varying angles may be made in an attempt to fill in any insufficiency in the previous scans or to verify the results from the first scan. In a similar way, the extensible engine can apply various tools in the toolkit to get different perspectives, or domain views, of the natural language query. These multiple "angles" may be used to better understand the natural language query and the associations and relationships between the individual words in the natural language query. Thus, the extensible engine may processes the natural language query by scanning the natural language query multiple times using the toolkit and the knowledge base.

The extensible engine may be implemented as a collection of algorithms and/or data structures. The extensible engine thus may be easily added to or easily modified without significant investments in software and without significant downtime, if any at all. The engine is not dependent on any one tool in the toolkit. It uses a collection of tools and can continue to operate when one or more tools is removed. Each algorithm or data structure may be used to process the natural language query in order, at random, one time, multiple times, or in any combination desirable, etc. until the relationships and associations of the words in the natural language query are sufficiently understood, i.e., no additional information can be inferred about the natural language query within the scope of the toolkit and knowledge base. The extensible engine may also include a main processing algorithm that directs the application of the toolkit and stores all intermediate results inside a plurality of data-structures. The extensible engine may store the intermediate results immediately. The extensible engine may be designed to store the intermediate results in a structure like a multi-dimensional matrix. The extensible engine may recognize and resolve ambiguity when different tools in the toolkit yield dissimilar outcomes and assess potential concepts and relationships between the concepts based on combining one or more outcomes from the operation of the toolkit. In one aspect, the engine repeatedly applies tools, captures outcomes, and assesses the concepts and relationships based on the combination of outcomes until no additional information can be inferred within the scope of the toolkit and the knowledge base.

Attached hereto is Appendix A which illustrates an example of the various functions which may be used by the extensible engine. The content in the Appendix is incorporated herein by reference and individual portions or all of the Appendix may be brought into the body of this specification by amendment.

The generated logical query may be platform independent so as to be adaptable to work with any logical query language or construct, for example, a SQL database or an MS Access database. The logical query is independent of platform, data source or database technologies. The logical can be converted into platform and data source queries by anyone skilled in the field of querying data.

FIG. 2B illustrates some of the basic components of the present invention. In connection with the further discussion herein, FIG. 2B illustrates a query 208 which may be a textual natural language query or an audible natural language query which is received into the system, preprocessor 210 preprocesses the query in a manner which communicates with toolkit 212 which is coupled to knowledge base 214. Following the preprocessing of the query, data is communicated to the processor 216 which performs the steps disclosed herein regarding implementing via a collection of algorithms or data structures to process the query multiple times in order to refer as much information as possible. The extensible engine 215 preferably encompasses the preprocessor 210 and the processor 216 and either generates a logical query 218 or communicates data to a logical query module which generates the logical query which is then used to search database 220 which produces the ultimate response which may produce an output which may also be communicated to a post-processing module 222 which optionally may perform some processing on the output of the database search which may or may nor be based on the toolkit knowledge base and which ultimately generates a response 224 to the user query. It is further noted that the various components of the preprocessor 210, the processor 216, the logical query module 218 and the post-processing module 222 may all be in communication with data from the toolkit or the knowledge base to aid in carrying out the particular functions of each individual module.

Figure 3:
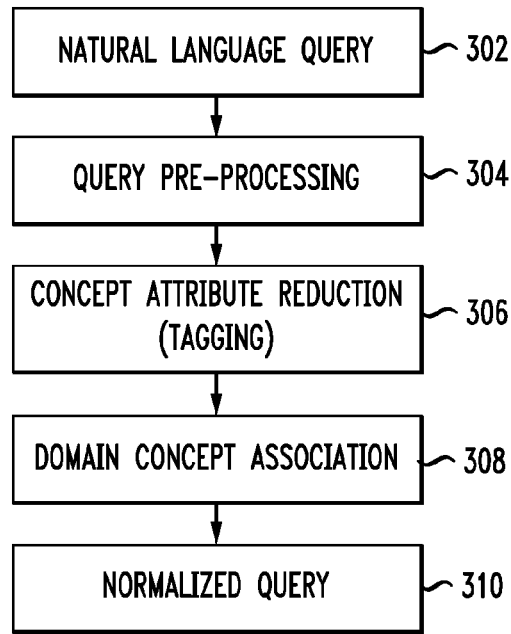
FIG. 3 illustrates high level flow diagram of the extensible engine.

FIG. 3 illustrates high level flow diagram of the extensible engine. First, the natural language query 302 is received for query preprocessing 304. The preprocessing may be composed of the following steps: token standardization (illustrated in more detail in FIG. 4), multi-word compaction, and derived concept recognition. Multi-word compaction may be useful because some words are not meaningful individually. Two or more words may represent the actual intended concept. Sometimes such individual words from a multi-word concept may mean something different than the intended meaning of that concept, e.g. New York or Cash Back. In the phrases "New York" or "Fico Score", 2 words together make a state but individually both of them have separate meanings. Thus it is important to convert such multi-word concepts into a single word or single token, so that they can be looked up easily in ontology.

Second, the natural language query is tagged in a process called concept attribute reduction 306. Third, domain concept association is performed on the natural language query 308 which results in a normalized query 310. It is important to know what information can be stored in ontology and how it is stored. Once that is decided, an algorithm which can use this information efficiently is applied. Most of the time, a concept does not come alone, meaning there are other related concepts derived from the core concept or domain of question. For example, in a credit card or financial domain, Cash Advance is a frequently used concept from which may flow the derived concept of Number of Cash Advances. Another example is the "concept" Purchase which may have a derived concept of Purchase Count and so on. The ontology design should be able to take care of such derived concepts when available and should not fail when they don't exist. Derived concepts are further illustrated in FIG. 5A.

Figure 4:
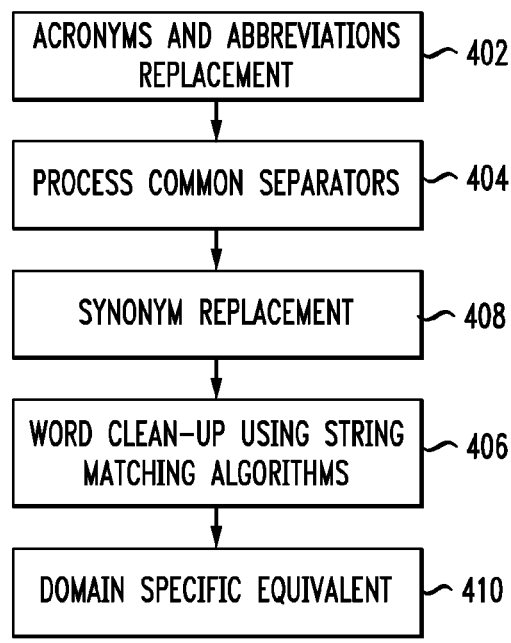
FIG. 4 illustrates a flow diagram of token standardization.

FIG. 4 illustrates an illustrative flow diagram of token standardization. Token standardization is the process of preparing the natural language query for processing. Often users type in wrong spellings, may put spaces in the wrong places, may not put spaces where required, or may use different characters to separate tokens in multi-token words (e.g. fico score, fico-score, ficoscore, etc). Before processing, it may be desirable that all variations be replaced by a standard form. Multiple techniques may be used to standardize the tokens in the natural language query; the example given is illustrative. First, the natural language query may be checked for acronyms and abbreviations 402. In this step, for example, FBI, F.B.I., and fbi could all be replaced with a uniform representation, something like Federal Bureau of Investigation. Commonly used acronyms and abbreviations may be replaced with their full forms. Next, the natural language query may be checked for common separators 404. As an example, this step could identify that a space, a semicolon, and a comma are all separators and treat them accordingly. Next, the natural language query may be evaluated for synonym replacement 406. The synonym replacement step could check for such phrases as "overdue", "30 days late", "a month late", "past due", etc. which share the same semantic meaning and may be replaced with a uniform word or phrase of equivalent meaning.

Similarly, words like "infant" and "baby" or "watch" and "clock" may be replaced with a standard word having the same meaning. The next step is to perform synonym replacements 408. Lastly in this section, the natural language query is searched for domain specific equivalents 410 which may be replaced to further standardize the natural language query. For example, a business manager may use the word "sales", but the domain specific equivalent could be understood to mean "monthly gross earnings." In this case, the word "sales" could be replaced with the domain specific equivalent that best fits the domain at hand.

Figure 5A:
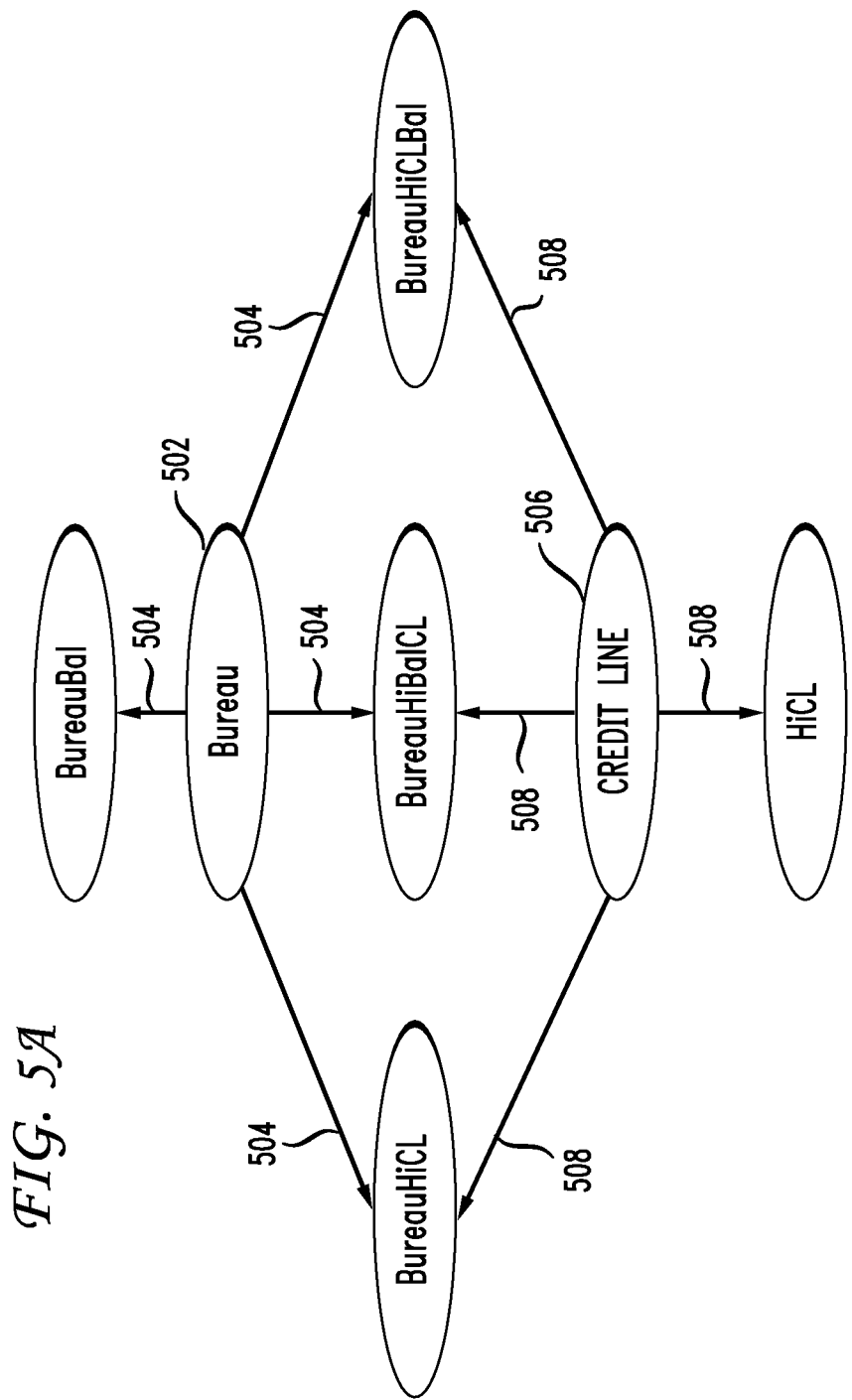
FIG. 5A illustrates an aspect of a snowflake formation.

FIG. 5A illustrates an aspect of the disclosure with derived concepts in a snowflake formation. Snowflake is a knowledge representation for entities which may be described using multiple words or entities. Normally, in order to recognize multi-word entities, users must either enter all the individual words in-order or exact sequence of the multi-word entity. Alternately, users can define a unique one-word label corresponding to the multi-word entity and use that instead in free-form querying. Both these approaches can be limiting in free-form querying or recognizing a natural language sentence.

Snowflake knowledge representation offers a more flexible approach similar to how human beings recognize complex entities by looking at a collection of words irrespective of order. To achieve this, Snowflake first captures the individual words and then recognizes that some of these words can be more prominent than others forming a context(s) for the entity.

A cluster or context can be defined either by experts choosing prominent words, or automatically by selecting common words across multiple snowflakes, or based frequently queried words potential combined with user feedback. For example, among the multi-word entities like Bureau Highest Credit Limit Balance, Bureau Highest Balance Credit Limit, Bureau Highest Credit Limit etc. BUREAU is a candidate for context or an expert can choose another word "Credit Limit".

Figure 5B:
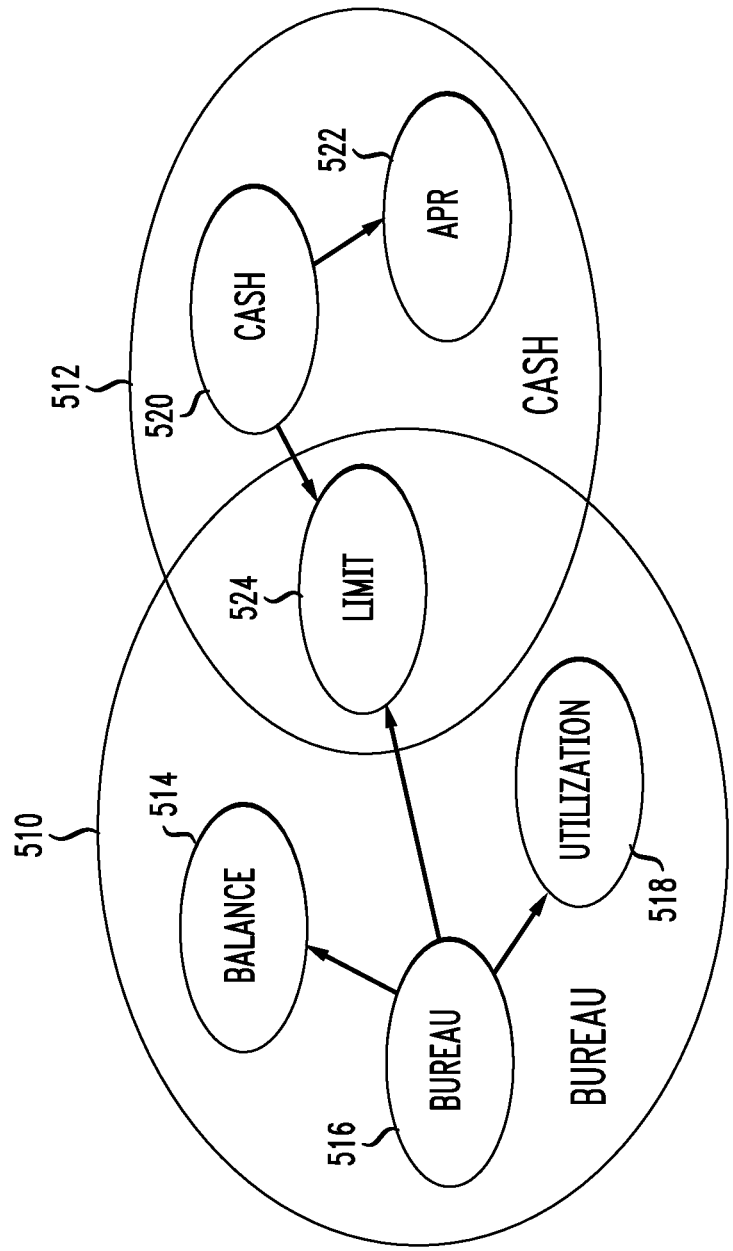
FIG. 5B illustrates another aspect of a snowflake formation.

FIG. 5B illustrates another, more loose or liberal concept of the snowflake formation. Here, the concept or business field of bureau 516 may have several associated concepts like balance 514, limit 524 and utilization 518. Similarly, a separate concept of cash 520 may have associated concepts of limit 524 and APR 522. In approach, wherever there is an overlap, which in this example is the concept of a "limit" 520, a cluster or context may be established. A cluster name such as bureau 510 may identify one cluster and another cluster, cash 522, may identify another cluster or context. Thus cluster words associated with the concept of "limit" 520 may be words in the Bureau context or cash context. The system may be flexible and consider both possibilities. Anything that may be common and cause an overlap across multi-word business terms may become a cluster. Thus a cluster may represent the bureau, the limit or cash and the system might process each scenario.

Lastly, words can have synonyms, abbreviations, hyponym, SMS equivalents, etc. all of which called Parallel Words in this disclosure. To recognize multi-word entities with parallel words as well, Snowflake knowledge representation integrates with parallel words dictionary and sometimes applicable only within a context(s). Similarly, formulae or conversion tables can also be incorporated with or without context.

As the name suggests, this design resembles a snowflake. A central, or main, concept Bureau 502 appears in the snowflake with derived concepts 504 surrounding it. These derived concepts can be derived from more than one concept also, as shown by the second central, or main concept Credit Line 506, with its associated derived concepts 508. A derived concept would generally contain one or more concepts and/or Statistics and/or a domain adjective. A domain adjective is a domain specific word which gives more information about other domain concepts. For example, BALANCE or AMOUNT when attached to concepts like Purchase, Sales, or Bureau may form new concepts or represent other names for the same concepts. For example, derived concepts 504 include BureauBal (Bureau Balance), and Bureau HiCL (Bureau high credit line).

A toolkit can include one or more independent processors, some examples of which include parts-of-speech (POS) tagger, domain-specific POS tagger, instance compactors, series compactors, range identifiers, string matching algorithms, operator-operand handlers, simple and comparative-statistics processors, instances handlers, timeframes processors, concept handlers, ID variables processors, equivalent concepts processors, and assumption handlers. A knowledge base can include regular expressions, connected graphs, and entity-relationship models. One of skill in the art would be capable, of determining other objects which may be included in a toolkit or knowledge base.

A toolkit can preprocess user input to standardize and consolidate domain, general, or attribute concepts. For example, a user input "Revenues from NY, NJ, and CT" can be reduced to two concepts, i.e., a concept called Revenue and concept called State with attributes or assets NY, NJ, and CT associated to State. A few preprocessing activities include token standardization, processing domain specific or independent synonyms, acronyms and abbreviations, processing common separators, processing synonyms both context dependent and independent, checking for misspelled words using string matching algorithm suite, compacting the multi token words, finding out derived concepts with the help of snowflake framework, tagging user query with POS tagger, tagging with domain specific tagger, recognizing instances and replacing with parent concept, recognizing ontological concepts, processing timeframe concepts and replacing with timeframe placeholders, and replacing common phrases like BETWEEN X AND Y, FROM B TO C, etc.

A knowledge base is preferably a repository of resources such as semantic frameworks explaining business or domain models and universal word patterns. The individual components, like regular expressions, entity relationship models, or other knowledge representations, are used in recognizing patterns, relationships between concepts, identifying attributes, instances, rules, etc. within the context of the relevant frameworks. The knowledge base can include independent as well as overlapping frameworks. For example, a framework representing a mortgage business model and a framework representing a time frame can be independent frameworks. Another example of an independent framework could be the construct, of the word "Between" as in "between X and Y" with its two attributes X and Y. However, a mortgage business framework and credit card business framework may be overlapping as in "Customer has Accounts has Loan Balances". A user input "customers with loan balance>1000" will be relevant to both these overlapping frameworks. Thus, an overlapping framework represents two different domains (such as the mortgage business domain and the credit, card business domain) in which a query may span or "overlap" the different frameworks but that overlapping may be considered a single framework. One concept such as a customer account could be common across the two domains. A knowledge base could have, many domain frameworks. Some of the domain frameworks may overlap in terms of their list of concepts.

The extensible engine processes a natural language query to generate a database or platform independent logical query. Preferably, the extensible engine has an associated main processing algorithm that engages portions of the toolkit (in no specific order) and stores all intermediate results in a plurality of data structures. A aspect of the extensible engine is the ability to tag user query by scanning it multiple times with the help of the toolkit and the knowledge base. Each scan results in a potential new tag for the user query tokens. The system then determines the potential meaning of the user query based on the collection of tags from multiple scans and the corresponding confidence levels or weights associated to each tag, much like a bar-code scanner determining the code with a high degree of confidence through multiple scans. However, there are differences from the bar-code scanner in that the scanner may need multiple passes and only one pass may provide information in that it successfully reads the bar-code. In the multiple scans of the extensible engine, different information may be gained if that passes. Each scan has a different set of goals. The tools and knowledge base do not need to be applied in any specific order. Instead this system applies all the tools and knowledge base repeatedly to understand the most likely meaning of the user query. A second aspect of the extensible engine is extensibility, the ability to add new tools and knowledge base without cumbersome or complex programming similar to a human learning a new skill or acquiring a new tool. The extensible engine may be implemented as a collection of algorithms and data structures. The extensible engine has a main processing algorithm that can engage these tools in no specific order and can methodically stores all the intermediate results inside the data-structures similar to the multi-dimensional matrix. The query may be parsed repeatedly until no additional information can be inferred within the scope of the natural language query.

The knowledge base can be enhanced, or extended, any time to provide a better context for a specific domain or domains. Similarly, more tools can be added to the toolkit to performing new pre-processing and tagging tasks. These features are possible because each individual tool in the toolkit is independent of other tool modules. While each individual tool is used independently, the results of the individual tools may differ depending on the whether other tool or tools were engaged or not. For instance, if a domain specific tagger is used, then a user query like "Revolving Sales" could be appropriately understood as "Sales of Revolving Customers" i.e. "Revolving" would be recognized as an adjective of "Sales" otherwise, it could be construed as two stand alone concepts: Revolving and Sales—which may not be what the user intended. In this way, more relevant tools in the toolkit can improve the accuracy of approximate answers. An individual tool from the toolkit may be called upon multiple times depending on the tokens and whether there are still tokens that are not recognized. For example, in the query "Sales for Year 2003", "2003" could be recognized by a POS tagger as a cardinal number, then as a potential instance of year and then a Time Frame Compactor can put these two pieces of information together to recognize this as "the year 2003", a timeframe attribute. The strength of the framework lies in the fact that it does not requires a particular order that the tools must be applied or the number of times a tool is used. It is driven by a two part goal or limiting criteria (1) each token is recognized as an attribute or a concept, and (2) toolkit cannot add any new information.

If a 2-dimensional matrix were to be used to visualize the process the converting a user's natural language query to a logical query, then the natural language query can be represented on one dimension and the application of the different tools on a second dimension. If N is the number of tokens in the user query and M is the total number of applications of one or more of the tools, also referred to as a "pass" in the scan, the matrix will be of size N×M. If the tokens are in columns and the passes are in rows then the cell value corresponding to a pass and a token represents the latest tag and the confidence level. The 2D matrix shows the progress of user query after each application of the tools, identification of associations and allowing retracing the process. This matrix will also be helpful in recognizing any conflicts; for example, if a token is recognized as an Organization in one pass and recognized as a Country in another pass they would be clearly evident in the matrix. In one aspect, the multi-dimensional matrix structure stores a plurality of labels describing query tokens or outcomes of each application of a took to the natural language query.

The extensible engine is associated with the following stages: (1) query pre-processing; (2) domain, general or attribute concept reduction; and (3) recognizing associations. First, query pre-processing includes three substeps: (A) token standardization, (B) multi-word compaction, and (C) derived concept recognition. Token standardization is the process of getting the natural language query ready for processing. Users often type in wrong spellings, put spaces in wrong places, not put spaces where required, or use different characters to separate tokens in multi-token words (e.g. fico score, fico-score, ficoScore, etc). Before processing it is important that variations should be replaced by a standard form. Multiple techniques can be used to achieve this: string matching, common separators checking, acronyms and abbreviation replacement, synonyms replacement, and domain-specific equivalent replacement.

Multi-word compaction combines words that are not meaningful individually and require a combination of multiple words to understand the intended concept. Sometimes such individual words from a multi-word concept may have different meanings than what the user intended, e.g. New York, Cash Back. In New York two words together make a state but individually both of them have separate meanings. The phrase Fico Score is the same way. Such multi-word concepts should be converted into a single word, so that they can be looked up easily in Ontology. It is necessary to do this step before Domain Tagging, as domain tagger will be using these compacted words.

Derived concept recognition may be exemplified by the following algorithm designed to detect the derived concepts (if any) embedded in the original user query. First, tag the user query using Tagging passes. Second, identify the main concept, domain adjectives and categorize the subordinating conjunctions as pre or post. Third, associate the STAT with either Domain Adjective or Concept next to it. Fourth, ignore the stop words, domain independent and domain specific. Fifth, rearrange the concepts, domain adjectives and Stats according to following order to get the derived concept: main concept, stat or domain adjective, associated concept.

At the end of pre-processing step, the toolkit would have transformed the words in the original query to their normalized values. The normalized values would come from language dictionaries and the knowledge base. Personalized words are replaced by their standard equivalents and multiple tokens are juxtaposed to recognize one combination word. All the typographical errors are handled and corrected to create a new list of normalized words.

Second, domain, general, or attribute concept reduction, also known as tagging, is a process of assigning the word of the query some meaningful tag that describes the purpose of the word in the query. For example, JANUARY is a month. AND is a coordinating conjunction. Tagging includes two steps: Part of Speech (POS) tagging and Custom Domain Word tagging. POS tagging is the process of marking up the words in a text as corresponding to a particular part of speech based on definition as well as context. It reads text in some language and assigns parts of speech to each word (and other token), such as noun, verb, adjective, etc. Custom domain word tagging is used to identify domain specific meanings of words. A word may be treated as an indicator and be applied with a default condition if it appears with another specific set of words.

Third, the recognizing associations step receives each word in the original query that is tagged with a list of all applicable tags as input. The tags could, for example, describe if the word is an instance, concept or a timeframe unit. Recognizing associations includes two substeps: establishing attribute-to-concept associations and capturing concept-to-concept relationships. Establishing attribute-to-concept associations refers to ontologies which contain relationships between different domain concepts and their defining attribute concepts, for example, ontology could contain information that sales information is stored in monthly or yearly intervals, customers are acquired in some specific, months, FICO Score is between range of 300 and 600, or any other pertinent information. Establishing attribute-to-concept associations is an attempt to find the instances of such information in the user query and associate it to respective domain concepts.

Once the user query is reduced to collection of domain concepts, understanding the relations between these domain concepts is necessary to understand the complete meaning of that query. The domain concept association step achieves this with help of domain frameworks or ontologies. Domain Ontology maintains information and associations between different domain concepts such as "customers have multiple credit card accounts", "each account is related to a specific credit card product", "customers belong to a state", "each account has monthly information stored like sales, late-fees, interest, credit limit", or "customers are associated with different credit card products". This step relates the domain concepts with help of information from ontology and joining words. Domain concepts may be associated with more than one relationship and in such cases, the user query may specify the association to be used, or a default relation may be selected by domain ontology. After these two steps, the final goal is achieved; the user query is reduced to a graph specifying different domain concepts associated with each other in a meaningful way.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code structures in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above, should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code structures for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable, consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention may be applied not only to search queries on a web page, but also natural language queries with portable GPS devices or automated telephone-based customer service. Accordingly, the appended claims and their legal equivalents should only define the invention, rather than any specific examples given.

We claim:

1. A non-transitory computer-readable storage medium storing a computer program including instructions for converting a natural language query into one or more logical queries, the instructions causing a general purpose computer to perform the steps comprising:
   storing a plurality of specialized tools to the non-transitory computer-readable storage medium, each of the plurality of specialized tools being adapted to perform a highly specific domain independent recognition task, each of the specialized tools operable independently from any of the other specialized tools, and each of the tools being adapted to operate independently of any particular data;
   receiving a natural language query;
   determining one or more knowledge bases for use by each of the specialized tools to perform its specific recognition task; and
   converting the natural language query to generate one or more logical queries in accordance with the one or more specialized tools.

2. The non-transitory computer-readable storage medium of claim 1, wherein the generated collective recognition is platform or data source independent.

3. The non-transitory computer-readable storage medium of claim 1, wherein the step of converting the natural language query comprises parsing the natural language query repeatedly by one or more of the specialized tools until every word is recognized as a domain, general, or an attribute concept, or until no additional information can be inferred about the natural language query within the scope of the specialized tools and knowledge base.

4. The non-transitory computer-readable storage medium of claim 3, wherein the knowledge base may include semantic frameworks explaining business or domain models, universal word patterns, mathematical or regular expressions, or conversion tables.

5. The non-transitory computer-readable storage medium of claim 3, wherein the special tools includes one or more of a speech tagger, spell checker, domain instance recognizer, word compactor, synonyms handlers, domain specific tagger, snowflake processor, ambiguity handlers, series recognizers, or word-pattern recognizers, each toolkit item being included in part or in whole.

6. The non-transitory computer-readable storage medium of claim 3, wherein the specialized tools process the natural language query by a plurality of scans of the natural language query using the specialized tools and the knowledge base, each scan having a different set of goals.

7. The non-transitory computer-readable storage medium of claim 1, wherein the specialized tools are not dependent on any one tool but instead uses a collection of tools, and wherein the specialized tools can continue to operate when one or more tools are removed.

8. The non-transitory computer-readable storage medium of claim 1, wherein the is specialized tools are implemented as a collection of algorithms and/or data structures.

9. The non-transitory computer-readable storage medium of claim 1, further comprising an instruction for selectively engaging portions of the specialized tools and storing all intermediate results inside a plurality of data-structures.

10. The non-transitory computer-readable storage medium of claim 9, wherein the specialized tools are applied in no specific order.

11. The non-transitory computer-readable storage medium of claim 9, further comprising an instruction for storing intermediate results methodically.

12. The non-transitory computer-readable storage medium of claim 9, wherein the plurality of data-structures is a multi-dimensional matrix-like data structure.

13. The non-transitory computer-readable storage medium of claim 12, wherein the multi-dimensional matrix-like structure stores a plurality of labels describing query tokens or outcomes of each application of a specialized tool to a natural language query.

14. The non-transitory computer-readable storage medium of claim 9, further comprising a set of instructions for recognizing and resolving ambiguity when different tools of the specialized tools yield dissimilar outcomes.

15. The non-transitory computer-readable storage medium of claim 9, further comprising a set of instructions for assessing potential concepts and relationships between the concepts based on combining one or more outcomes.

16. The non-transitory computer-readable storage medium of claim 9, further comprising a set of instructions for repeatedly applying specialty tools, capturing outcomes, and assessing the concepts and relationships based on the combination of outcomes until no additional information can be inferred within the scope of the specialized tools and the knowledge base.

17. A system for converting a natural language query into a one or more logical queries, comprising:
   a plurality of domain independent specialized tools stored on a non-transitory computer readable storage medium, each of the plurality of specialized tools being adapted to perform a highly specific recognition task, each of the specialized tools operable independently from any of the other specialized tools, and each of the recognition tools being adapted to operate independent of any particular data;
   one or more knowledge bases stored on a non-transitory computer readable storage medium for use by one or more of the specialized tools to perform its specific recognition task; and
   an extensible engine, of a processor, which converts the natural language query to one or more logical queries in accordance with one or more of the plurality of specialized tools by causing a general purpose computer to generate a collective recognition judgment in accordance with individual recognition results received from a plurality of the plurality of specialized tools, at least two of the plurality specialized tools performing its highly specific recognition task on a similar portion of natural language query and providing distinct interpretation results, the computer outputting the collective judgment to a non-transitory computer readable storage medium.

18. The system of claim 17, wherein the specialized tools may be applied in the system in any order.

19. The system of claim 17, wherein the specialized tools may be applied one or more times until no further information may be ascertained.

20. The system of claim 17, wherein the recognition engine determines a logical query based upon the natural language query.

21. The system of claim 20, wherein the generated one or more logical queries are platform or data source independent.

22. The system of claim 17, wherein the knowledgebase comprises one or more of a recognition specific knowledge base, a universal knowledge base, and a contextual knowledge base.

23. The system of claim 17, wherein converting the natural language query includes parsing the natural language query repeatedly until every word is recognized as a domain, general, or an attribute concept, or until no additional information can be inferred about the natural language query in accordance with the specialized tools.

24. The system of claim 17, wherein the knowledgebase may include semantic frameworks explaining business or domain models, universal word patterns, mathematical or regular expressions, or conversion tables.

25. The system of claim 17, wherein the specialized tools comprise one or more of a speech tagger, spell checker, domain instance recognizer, word compactor, synonyms handlers, domain specific tagger, snowflake processor, ambiguity handlers, series recognizers, or word-pattern recognizers, each specialized tool being included in part or in whole.

26. The system of claim 17, wherein the extensible engine is not dependent on any one tool but instead uses a collection of tools, and wherein the recognition engine is adapted to continue to operate when one or more tools are removed.

27. The system of claim 17, wherein the extensible engine converts the natural language query by a plurality of scans of the natural language query using the tools and the knowledgebase, each scan having a different set of goals.

28. The system of claim 17, wherein the extensible engine is implemented as a collection of algorithms and/or data structures.

29. The system of claim 17, wherein the extensible engine has a main processing algorithm that engages portions of the tools and stores all intermediate results inside a plurality of data-structures.

30. The system of claim 29, wherein the main processing algorithm engages portions of the tools in no specific order.

31. The system of claim 29, wherein the plurality of data-structures is a multi-dimensional matrix-like data structure.

32. The system of claim 31, wherein the multi-dimensional matrix-like structure stores a plurality of labels describing query tokens or outcomes of each application of a tool to the natural language query.

33. The system of claim 29, wherein the extensible engine can recognize and resolve ambiguity when different tools in the toolkit yield dissimilar outcomes.

34. The system of claim 29, wherein the extensible engine assesses potential concepts and relationships between the concepts based on combining one or more outcomes.

35. The system of claim 29, wherein the extensible engine repeatedly applies tools, captures outcomes, and assesses the concepts and relationships based on the combination of outcomes until no additional information can be inferred within the scope of the tools and the knowledgebase.

36. A system for converting unstructured content into structured content, comprising:

a plurality of domain independent specialized tools stored on a non-transitory computer readable medium, each of the plurality of specialized tools being adapted to perform a highly specific recognition task, applicable to one or more portions of the unstructured content, each of the specialized tools operable independently from any of the other specialized tools and in any order and any number of times, and each of the specialized tools being adapted to operate independent of any particular data;

one or more knowledge bases stored on the non-transitory computer readable medium for use by one or more of the specialized tools to perform its specific recognition task; and a recognition engine, of a processor, which converts unstructured content to structured content with one or more of the plurality of specialized tools by causing a general purpose computer to generate a collective recognition judgment in accordance with individual recognition results received from a plurality of the plurality of specialized tools, the structured content being searchable by one or more generated logical queries.

37. A system for universal recognition, comprising:

a plurality of domain independent specialized tools stored on a non-transitory computer readable medium, each of the plurality of specialized tools being adapted to perform a highly specific recognition task, each of the specialized tools operable independently from any of the other specialized tools, and each of the specialized tools being adapted to operate independent of any particular data;

one or more knowledge bases stored on a non-transitory computer readable medium for use by one or more of the specialized tools to perform its specific recognition task;

an extensible engine, of a processor, which converts a natural language query to one or more logical queries in accordance with one or more of the plurality of specialized tools by causing a general purpose computer to generate a collective recognition judgment in accordance with individual recognition results received from a plurality of the plurality of specialized tools, at least two of the plurality specialized tools performing its highly specific recognition task on a similar portion of the natural language query and providing distinct interpretation results, the computer outputting the converted logical query to a non-transitory computer readable medium; and one or more groups of content stored to the non-transitory computer readable medium, the one or more logical queries being applicable to search one or more of the one or more groups of content.

* * * * *